(12) United States Patent
Fukushima et al.

(10) Patent No.: US 6,583,352 B2
(45) Date of Patent: Jun. 24, 2003

(54) ELECTROMAGNETIC SHIELDING STRUCTURE

(75) Inventors: Hirotaka Fukushima, Haibara-gun (JP); Yutaka Masuda, Haibara-gun (JP); Hidehiko Kuboshima, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/128,497

(22) Filed: Apr. 24, 2002

(65) Prior Publication Data

US 2002/0157843 A1 Oct. 31, 2002

(30) Foreign Application Priority Data

Apr. 25, 2001 (JP) ........................................ 2001-127922

(51) Int. Cl.7 .................................................. H05K 9/00
(52) U.S. Cl. ................. 174/35 R; 174/35 C; 174/74 R; 439/271; 439/610
(58) Field of Search ............................ 174/35 R, 35 C, 174/61, 64, 74 R, 102 R, 107, 65 R, 89; 439/271, 274, 607, 609, 610

(56) References Cited

U.S. PATENT DOCUMENTS 3,990,765 A * 11/1976 Hill ............................ 439/610
4,786,757 A * 11/1988 Owensby et al. ......... 174/35 C
4,896,000 A * 1/1990 Procter et al. ............. 174/74 R
5,739,472 A * 4/1998 Buck et al. ................. 174/107

FOREIGN PATENT DOCUMENTS

JP  6-23179  3/1994

\* cited by examiner

Primary Examiner—Dean A. Reichard
Assistant Examiner—Carmelo Oliva
(74) Attorney, Agent, or Firm—Sughrue Mion, PLLC

(57) ABSTRACT

An electric shielding structure includes: a structure-attached body; an insulating housing, through which an electric wire is passed, watertightly held by the structure-attached body; an elastic sealing member held by the housing and being in watertight contact with an outer periphery of the wire; a flexible and electrically conductive shielding sheet for covering the wire; a shielding terminal electrically conducted with the structure-attached body in a state in which an outer surface thereof is covered by and contacted with a skirt portion of the shielding sheet; a band-like clamp tightly fasten the skirt portion of the shielding sheet from the outside and to cause the end part of the skirt portion to be in intimate contact with the outer surface of the shielding terminal; and a protector for covering the clamp from the outside thereof and for accommodating and protecting the members.

5 Claims, 8 Drawing Sheets

ELECTROMAGNETIC SHIELDING STRUCTURE

BACKGROUND OF THE INVENTION

The present invention relates to an electromagnetic shielding structure for connecting electric wires or cables to input and output terminals of a motor and general electronic equipment mounted on, especially, an electric car.

In the case that electric wires or cables are connected to input and output terminals of a motor mounted on an electric car, a grounding structure, in which a shielding member is grounded by being connected to a structure-attached body such as a casing for accommodating the motor, is employed so as to prevent leakage of electromagnetic waves from the wires or cables to the outside, and conversely, so as to protect the motor from the influence of external electromagnetic waves received from the outside.

An example of an electromagnetic shielding structure of such a kind is a connector for a shielding cable, which is shown in FIG. 8 and described in Japanese Utility Model Publication Hei. 6-23179. In this connector, a plurality of pin terminals 3 are held by a terminal holding member 2 provided in a metallic cylindrical shell 1. A shielding cable 4 to be connected to this connector is constructed by twisting a plurality of insulated cores 5, which are constituted by conductors 5a, such as copper wires, coated with insulating materials 5b, and then putting a metallic braid 6 around the twisted and insulated cores 5 as a shielding sheet, and further covering the metallic braid 6 with a sheath 7 serving as an outermost layer. The conductors 5a are exposed by peeling such a cable terminal. Each of such conductors 5a is connected to a corresponding one of pin terminals 3.

The sheath 7 serving as the outermost layer of the cable terminal is peeled, so that the braid 6 is made uncovered. Then, this exposed braid 6 is covered with a cylindrical metallic net 8. Moreover, this metallic net 8 is covered with a heat shrinkable tube 9. Thus, the metallic net 8 is connected and fixed to both the connector-side shell 1 and the cable-side braid 6 by a contractional pressure obtained by heating this heat shrinkable tube 9. Consequently, the cable-side braid 6 is fixed to the connector-side shell 1 in a state, in which the braid 6 and the shell 1 are electrically conducted to each other, to thereby provide electromagnetic shielding.

Meanwhile, this magnetic shielding structure shown in FIG. 8 and described in the aforementioned official gazette has encountered the following problems.

One of the problems is that the metallic net 8 is pressed own only by a pushing force due to shrinkage of the heat shrinkable tube 9, which is caused by applying heat thereto, and the connector-side shell 1 is brought into contact with the cable-side braid 6 to thereby put the shell 1 and the braid 6 into an electrically conducted state, that thus, the braid 6 is insufficiently pressed against the shell 1, that shield resistance is unstable, that electromagnetic shielding is not effectively provided, and that the reliability of the connection therebetween cannot be expected.

Further, another of the problems is that when the heat shrinkable tube 9 is damaged, for example, tore, there is a fear that the metallic net 8 providing the connection between the shell 1 and the braid 6 and the contact therebetween is detached to thereby cause a state in which the shell 1 is not electrically conducted to the braid 6.

SUMMARY OF THE INVENTION

Accordingly, an object of the invention is to provide an electromagnetic shielding structure enabled to effectively provide electromagnetic shielding by enhancing the reliability of the connection.

In order to solve the aforesaid object, the invention is characterized by having the following arrangement.

(1) An electromagnetic shielding structure comprising:

an electrically conductive grounded and structure-attached body;

an insulating housing, through which an electric wire is passed, watertightly fitted into and held by the structure-attached body;

an elastic sealing member fitted into and held by the housing and being in watertight contact with an outer periphery of the wire;

a flexible and electrically conductive shielding sheet for covering the wire;

a shielding terminal electrically conducted with the structure-attached body in a state in which an outer surface thereof is covered by and contacted with an end part of a skirt portion of the shielding sheet;

a band-like clamp tightly fasten the end part of the skirt portion of the shielding sheet from the outside thereof and to cause the end part of the skirt portion to be in intimate contact with the outer surface of the shielding terminal; and a protector for covering the clamp from the outside thereof and for accommodating and protecting the structure-attached body, the housing, the elastic sealing member, the shielding sheet, the shielding terminal, and the clamp.

(2) The electromagnetic shielding structure according to (1), wherein the housing includes front and rear housing portions holding the elastic sealing member from front and rear sides thereof, respectively, to bring a part of an outer circumferential surface of the elastic sealing member into intimate contact with the structure-attached body, and the front housing is engaged with a metal terminal attached to an end portion of the wire.

(3) The electromagnetic shielding structure according to (1), wherein the elastic sealing member is closed by an electrically conductive cover from one side thereof, and a stopper is provided to the housing to prevent a metal terminal attached to the wire from moving.

(4) The electromagnetic shielding structure according to (1), wherein an inner portion of the shield sheet is welded to the shielding terminal by performing spot-welding on the clamp.

(5) The electromagnetic shielding structure according to (1), wherein end parts of skirt portions of the shielding terminal and the protector are together connected to the structure-attached body by bolt.

With the aforementioned configuration, in the case that the electrically conductive shielding sheet that covers the full length of the electric wire, when an electromagnetic shield is electrically conducted by connecting an end part of a skirt portion of this braid to the structure-attached body B, the end part of the skirt portion of this braid is inserted into between the shielding terminal and the clamp and fixed to therebetween. Thus, the end part of the skirt portion of the braid can be reliably and firmly connected to the structure-attached body. The clamp is shaped like a band. Thus, the end part of the skirt portion of the braid is tightly fastened, so that sufficient contact is obtained over the entire circumference thereof. Moreover, this structure can completely eliminate the fear that the braid may be tore. Consequently, it can be expected that effective electromagnetic shielding effects are obtained. Further, stable electric characteristics are obtained, so that the reliability of the connection therebetween can be enhanced.

In this case, the entire electromagnetic shielding structure portion is accommodated in the protector. Thus, the first magnetic shielding structure is effective in protecting the electrically shielding sheet, such as the braid, without exposing the shielding sheet to the outside.

According to the invention, the housing is divided into the front portion and the rear portion. Thus, the entire elastic sealing member other than the parts, which are fitted into the structure-attached body in such a manner as to be watertightly in intimate contact therewith, can be held and protected in the front housing and the rear housing. Moreover, this electromagnetic shielding structure is effective in preventing an occurrence of misalignment of the axis of the elastic shielding member.

According to the invention, when the housing is closed by the electrically conductive cover member, this electromagnetic shielding structure is effective in preventing an occurrence of misalignment of the axis of the wire passed through and held in the housing by way of the elastic sealing member. This electromagnetic shielding structure is also effective in preventing the elastic shielding member from slipping off. Furthermore, the movement in the direction of the axis and the slip-off of the metal terminal fitting is regulated and prevented by the stopper provided in the housing.

According to the invention, the electrically conductive band-like clamp is spot-welded. Thus, the entire circumference of the end part of the skirt portion of the braid serving as the electrically conductive shielding sheet is brought into rigid contact with the shield terminal. Thus, there are no fears that the contact force may be insufficient that the braid may be tore. Reliable shielding and conducting between the structure-attached body and the shielding terminal are achieved. Consequently, stable electromagnetic-shielding effects can be obtained.

According to the invention, more stable and reliable shielding and conducting of the portion for connecting electric wires or cables to the input and output terminals can be obtained by fastening together the shielding terminal and the protector to the structure-attached body by bolts.

DETAILED DESCRIPTION OF PREFERRED EMBODIMENTS

Hereinafter, embodiments of an electromagnetic shielding structure of the invention are described in detail with reference to the accompanying drawings.

Figure 1:
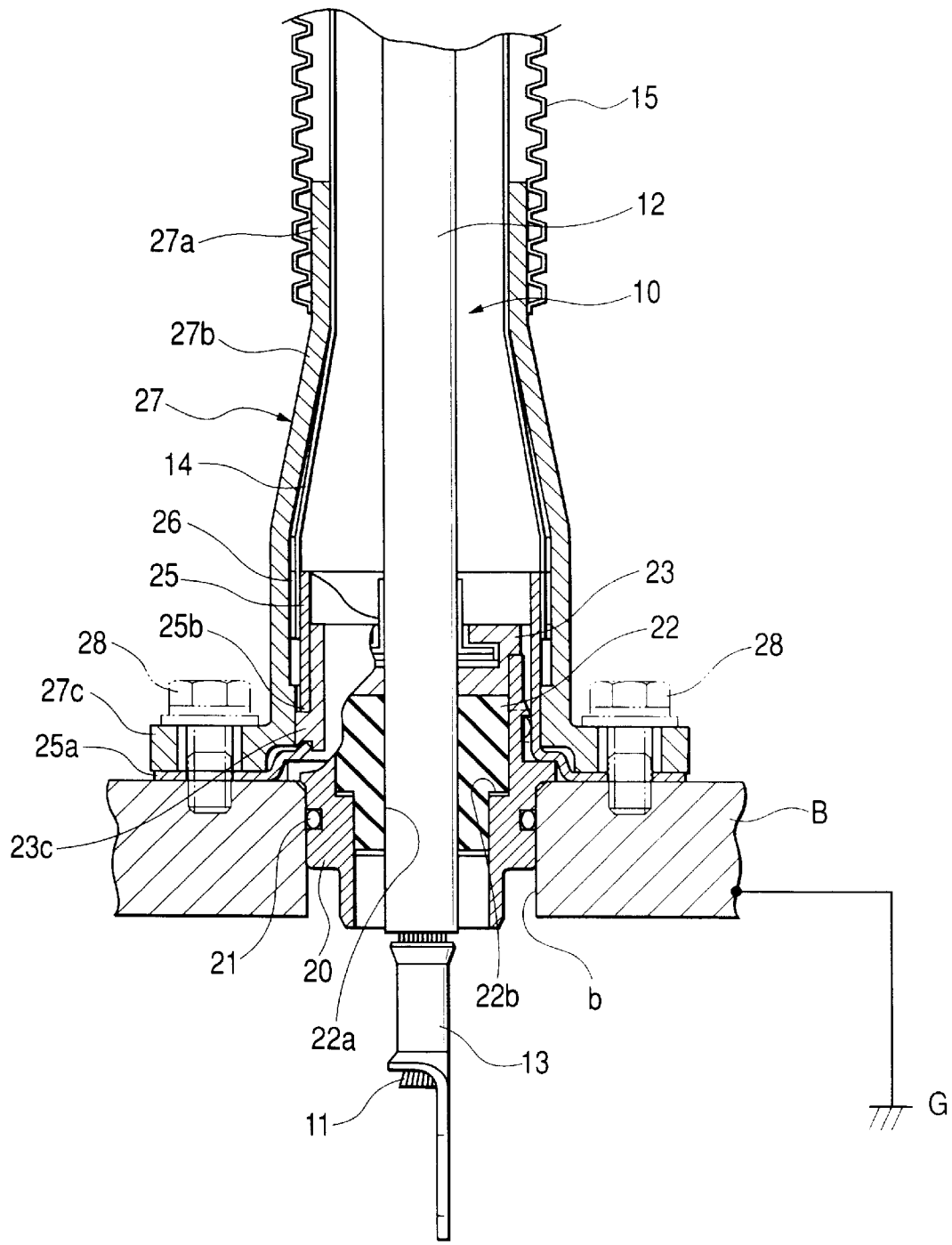
FIG. 1 is a side sectional view illustrating a first embodiment of an electromagnetic shielding structure of the invention.
Figure 2:
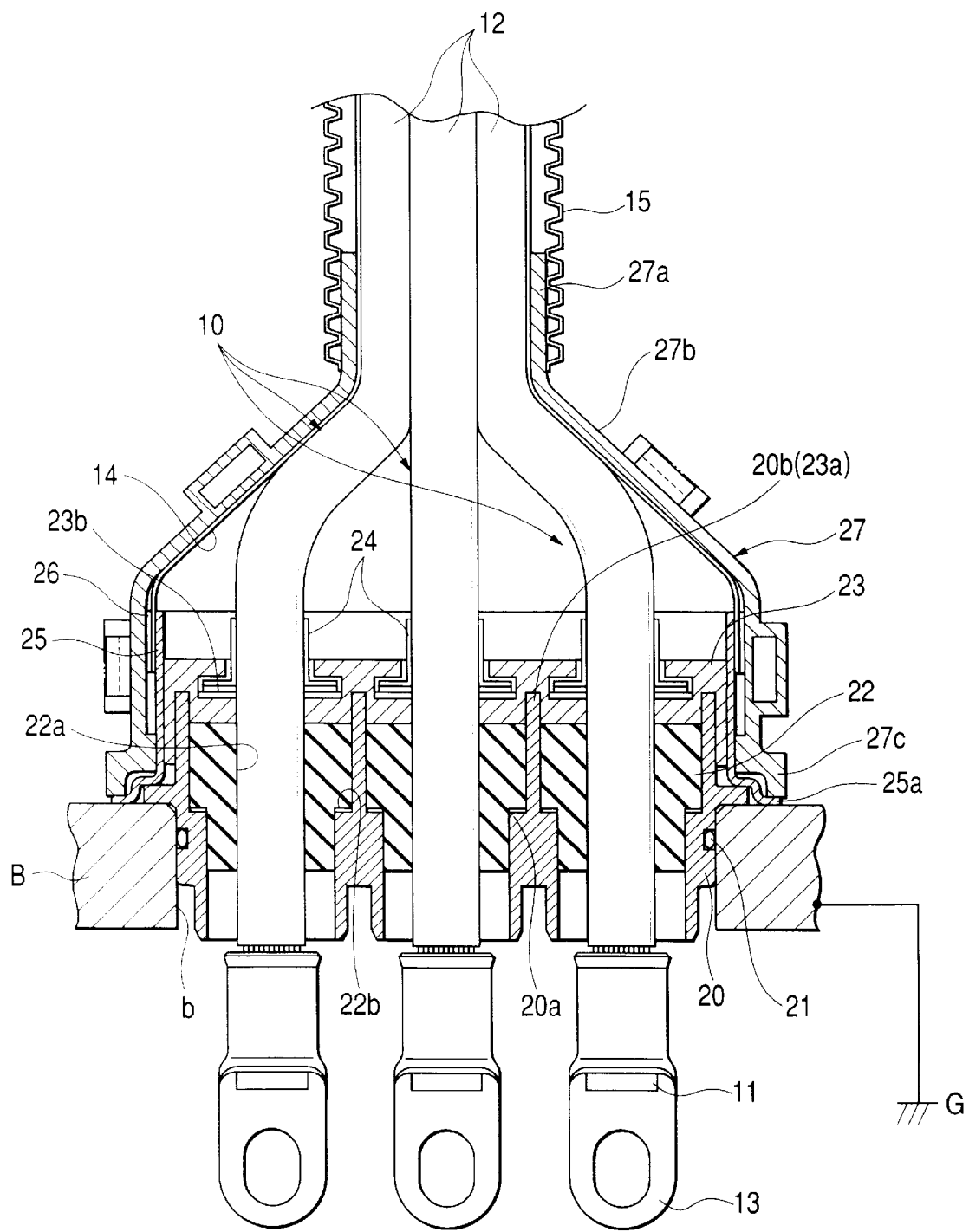
FIG. 2 is a front sectional view illustrating the first embodiment.
Figure 3:
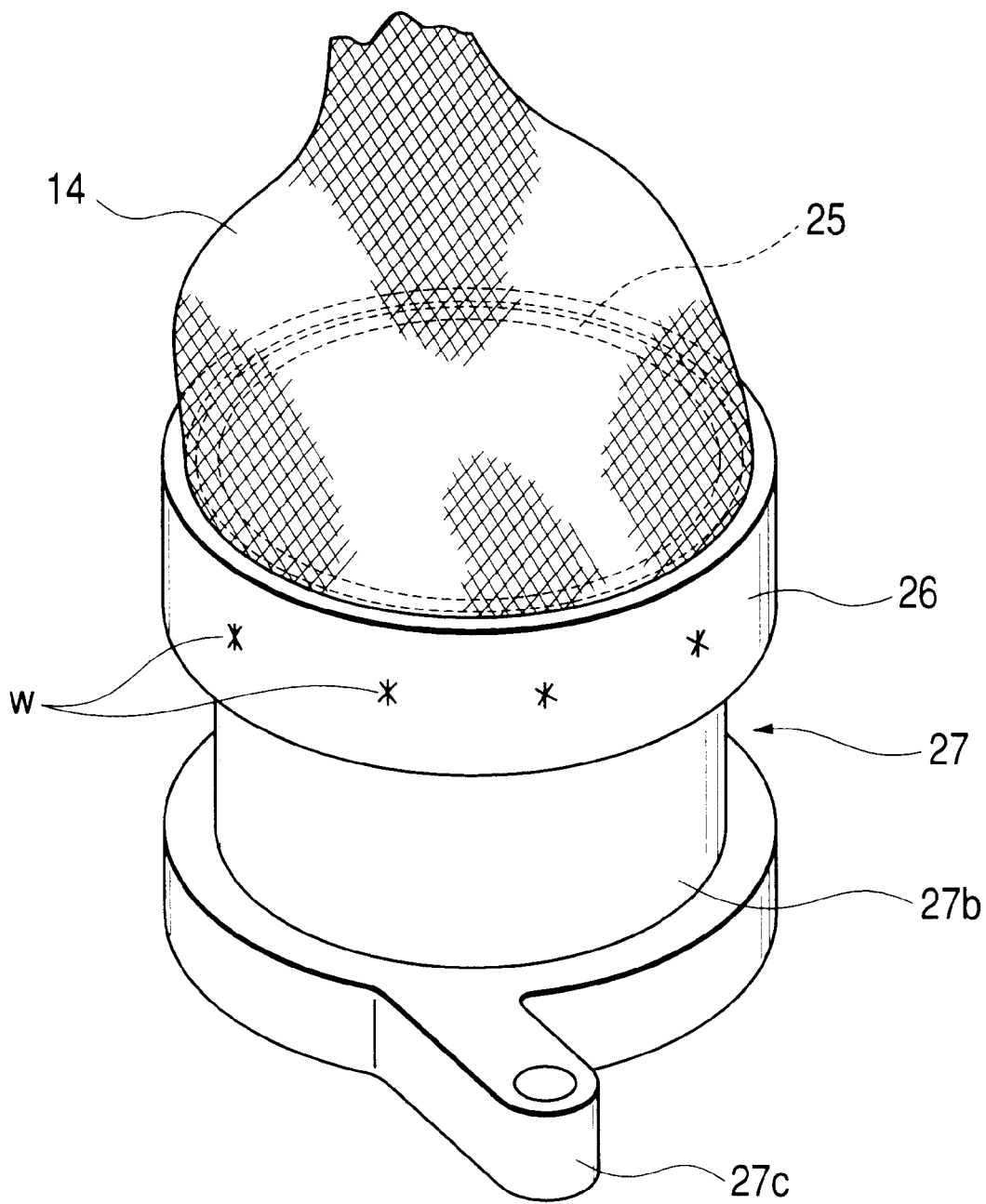
FIG. 3 is an external view illustrating the first embodiment that is in a post-assembly state.

FIGS. 1 to 3 are a side sectional view, a front sectional view, and an assembly perspective view illustrating the configuration of a first embodiment, respectively. A structure-attached body B is a body on which this structure is attached, and made of a material such as aluminum, which is not limited herein to a specific material. Practical examples of the structure-attached body B are housings for a motor and various kinds of electronic or electric equipment, which are mounted on an electric car. The structure-attached body B is protected by connecting electric wires 10 to the input and output terminals thereof from the influence of electromagnetic waves. An attaching hole b for attaching this structure to such a structure-attached body B is provided therein.

The electric wires 10 fixed to such a structure-attached body B by passing an end portion thereof through the structure-attached body B are a set of three wires, as illustrated in these figures, and drawn and arranged in, for instance, a car body in a protection state in which the three wires are bundled and passed through a corrugated tube 15. Usually, the wires 10 are manufactured by extrusion-coating conductors 11, such as copper wires, with insulating materials 12. At each of terminals of such electric wires 10, the conductors 11 are exposed by being peeled therefrom. Then, metal terminal fitting 13 called "LA terminal" is caulked and press-attached to the conductor 11. The conductor 11 is electrically conducted by bolting the metal terminal fitting 13 to the input/output terminal of the motor.

The three wires 10 are bundled and then covered with an electrically conductive braid 14 serving as a practical example of a flexible shielding sheet according to the invention. This structure is adapted so that the three wires 10 are protected by being passed together with this braid 14 through the corrugated tube 15. Meanwhile, in the case that each of the wires 10 is formed by internally and integrally embedding the braid therein like a shielding wire, it is necessary to peel a terminal portion of a required length from each of the wires 10 and to expose the braid. In contrast, in the case that a bundle of three wires is externally covered by the singly used braid 14 like this embodiment, an operation of peeling the wire for exposing the braid is unnecessary.

The terminal portion of each of the wires 10, to which the metal terminal fitting 13 is press-attached, is attached to the structure-attached body B by being passed through the attaching hole b in a state in which the terminal portion is held by an electromagnetic shield structure portion consisting of the following members. A housing 20 formed from an insulating material is fitted into the attaching hole b through an O-ring 21 serving as a sealing member in such a manner as to ensure watertightness. In this housing 20, a rubber sealing member 22 is fitted and held in such away as to be in elastically intimate contact therewith. The three wires 10 are fitted into and held in three holding holes 22a penetrating through this elastic sealing member 22 in a state in which the three wires 10 are in intimate contact with one another. Corrugations and notches are formed on the circumferential surface of each of the holding holes 22a so that this circumferential surface thereof is easily in intimate contact with the outer periphery of the corresponding wire 10. Thus, the elastic sealing member 22 ensures the watertightness between the wire 10 and the housing 20.

A stepped portion 22b formed as a step-like part on a side of the elastic sealing member 22 abuts against a stepped portion 20a of the housing 20. This prevents a slip-off operation of each of the held wires 10, that is, prevents the held wires 10 from moving downwardly and frontwardly, as viewed in these figures.

A stopper holder 23 for pushing the elastic sealing member 22 from rear is provided so as to prevent the wires 10 from moving upwardly and rearwardly, as viewed in these figures. This stopper holder 23 is connected to the housing 20 by causing each set of a concave portion 23a and a corresponding convex portion 20b to be fitted to each other. A stop groove 23b is provided in the stopper holder 23. Each of cap-like stoppers 24 is caught in this stop groove 23b. This stopper 24 is caulked and press-attached to the outer periphery of each of the corresponding wire 10. Such a stopper holder 23 and the stopper 24 prevent the wires 10 from slipping off therefrom and shaking. Moreover, as is seen in a partly broken and sectional view illustrated in a left-side half of FIG. 1, a locking claw 23c is provided in a leg part of a skirt portion of such a stopper holder 23. This locking claw 23c is locked in a locking hole 25b provided in an electrically conductive cylindrical shielding terminal 25 (to be described next) from the inside thereof.

The electrically conductive and cylindrical sealing terminal 25 is fitted to the outer circumferential surface of the stopper holder 23. An end part of a skirt portion of the braid 14 is widened and connected to the outer circumferential surface of such a shielding terminal 25 in such a way as to cover the outer circumferential surface thereof. The end part of the skirt portion of the braid 14 is tightly fastened by an electrically conductive metallic band-like clamp 26 from the outside, and thus inserted into and fixedly attached to between the shield terminal 25 and the clamp 26. To make the fixed attachment of the braid 14, which is achieved by fastening the clamp 26, more rigid and reliable, spot-welding is performed at places designated by reference character "w" with suitable pitches from the outside of the clamp 26, as illustrated in FIG. 3. Thus, the braid 14 can be rigidly welded to the shielding terminal 25.

A funnel-like protector 27 serving as an outermost member of the electromagnetic shielding structure is provided in such a way as to be fitted into and hold such a clamp 26 from the outside thereof. A narrowed end portion 27a of this protector 27 is sandwich-held between the terminal portion of the corrugated tube 15 and the braid 14. Each of the aforementioned members is protected by being accommodated into a trunk portion 27b, which is shaped like a frustum by gradually increasing the diameter thereof. This protector 27 has a flange portion 27c obtained by shaping the bottom of the trunk portion 27b like a guard. This flange portion 27c and a flange portion 25a, which is provided like a guard in the skirt portion of the shielding terminal 25, are fastened together by bolts 28 from above. Thus, the shielding terminal 25 is connected and fixed to the top surface of the structure-attached body B.

That is, the flange portion 25a of the shielding terminal 25 is connected to between the flange portion 27c of the protector 27 and the aluminum structure-attached body B by being sandwiched from above and below and fastened together by the bolts 28. Thus, the shielding terminal 25 is stably fixed. Slip-off and movement in the direction of an axis of the stopper holder 23 itself are prevented by engaging the locking claw 23c of the stopper holder 23 with the locking hole 25b of this fixed shielding terminal 25. Thus, the braid 14 is connected to a ground G by being joined to the shielding terminal 25 and the structure-attached body B. This prevents an occurrence of leakage of electromagnetic waves from the conductors 11 of the wires 10 to the outside. Conversely, the braid 14 is prevented from being affected by electromagnetic waves received from the outside.

With the aforementioned configuration, the electromagnetic shielding structure of the first embodiment acts as follows.

The shielding terminal 25 fixedly attached to the end part of the skirt portion of the braid 14 is covered and protected by the protector 27 from the outside. The flange portion 25a provided in the skirt portion of the shielding terminal 25 and the flange portion 27c of the protector 27 are connected to the structure-attached body B by being fastened together by the bolts 28. Thus, the electromagnetic shielding and the electrically conducting of the portion for connecting the wires to the input and output terminals are achieved.

Such an end part of the skirt portion of the braid 14 is firmly inserted into and fixedly attached to between the shielding terminal 25, which is provided at the inner side, and the ring-like clamp 26, which is provided at the outer side. This completely eliminates the fear that the braid 14 may slip off, similarly as the braid does in the case of employing the conventional structure. To make the contact and connection between the braid 14 and the shielding terminal 25 more firm and reliable, the clamp 26, the braid 14 and the shielding terminal 25 may be integrally welded to one another by spot-welding the clamp 26. With such a fixed structure, the braid 14 is not caused by a tensile external force and a torsional force to come off from the shielding terminal 25. Thus, the stiffness and durability thereof is enhanced. After the wires 10 are connected to the input and output terminals, the influence of electromagnetic waves can be eliminated owing to excellent electrical conductivity and shielding effects. Consequently, stable electric characteristics can be maintained. The reliability due to the wiring of the wires 10 can be enhanced.

Figure 4:
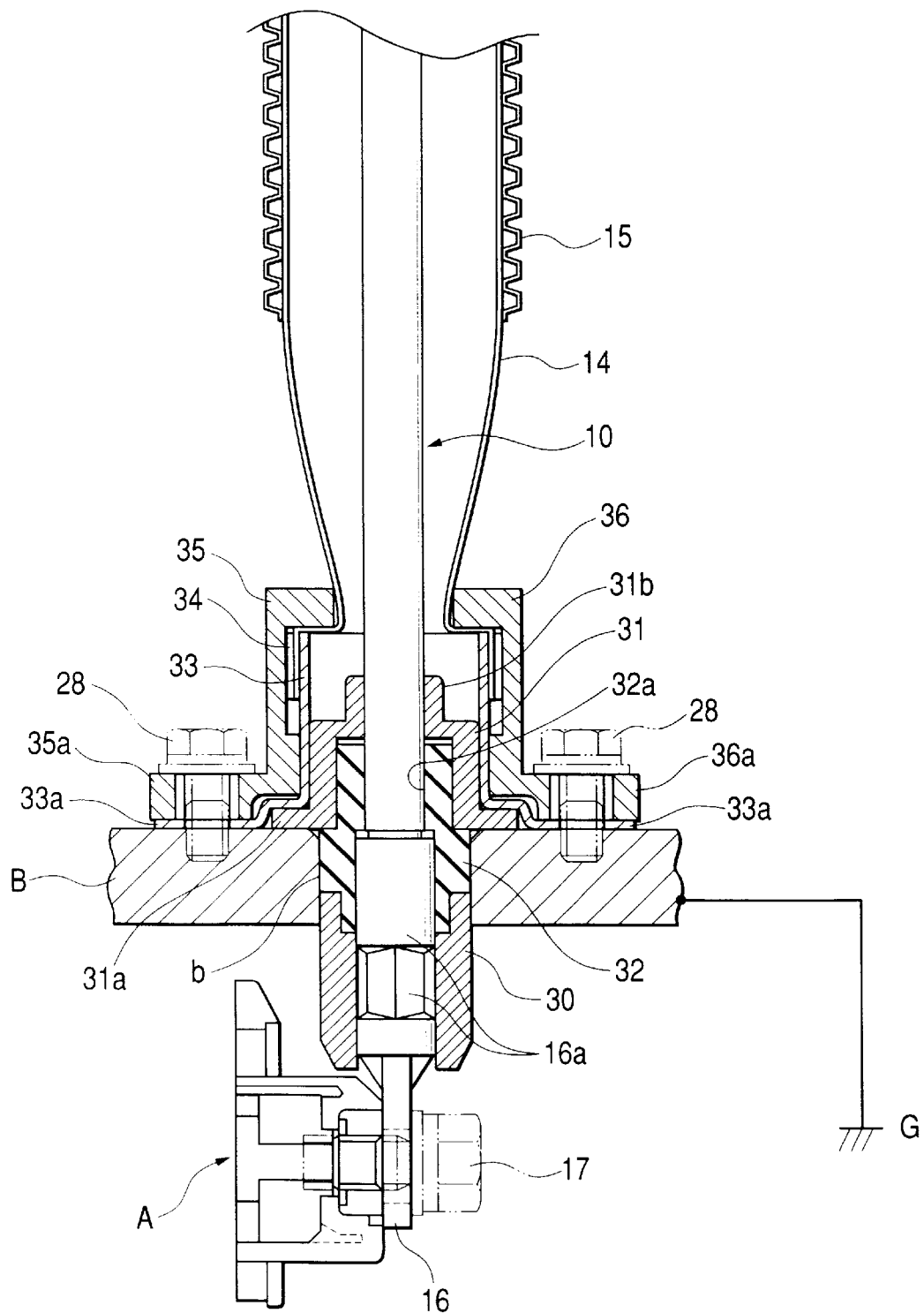
FIG. 4 is a side sectional view illustrating a second embodiment of an electromagnetic shielding structure of the invention.
Figure 5:
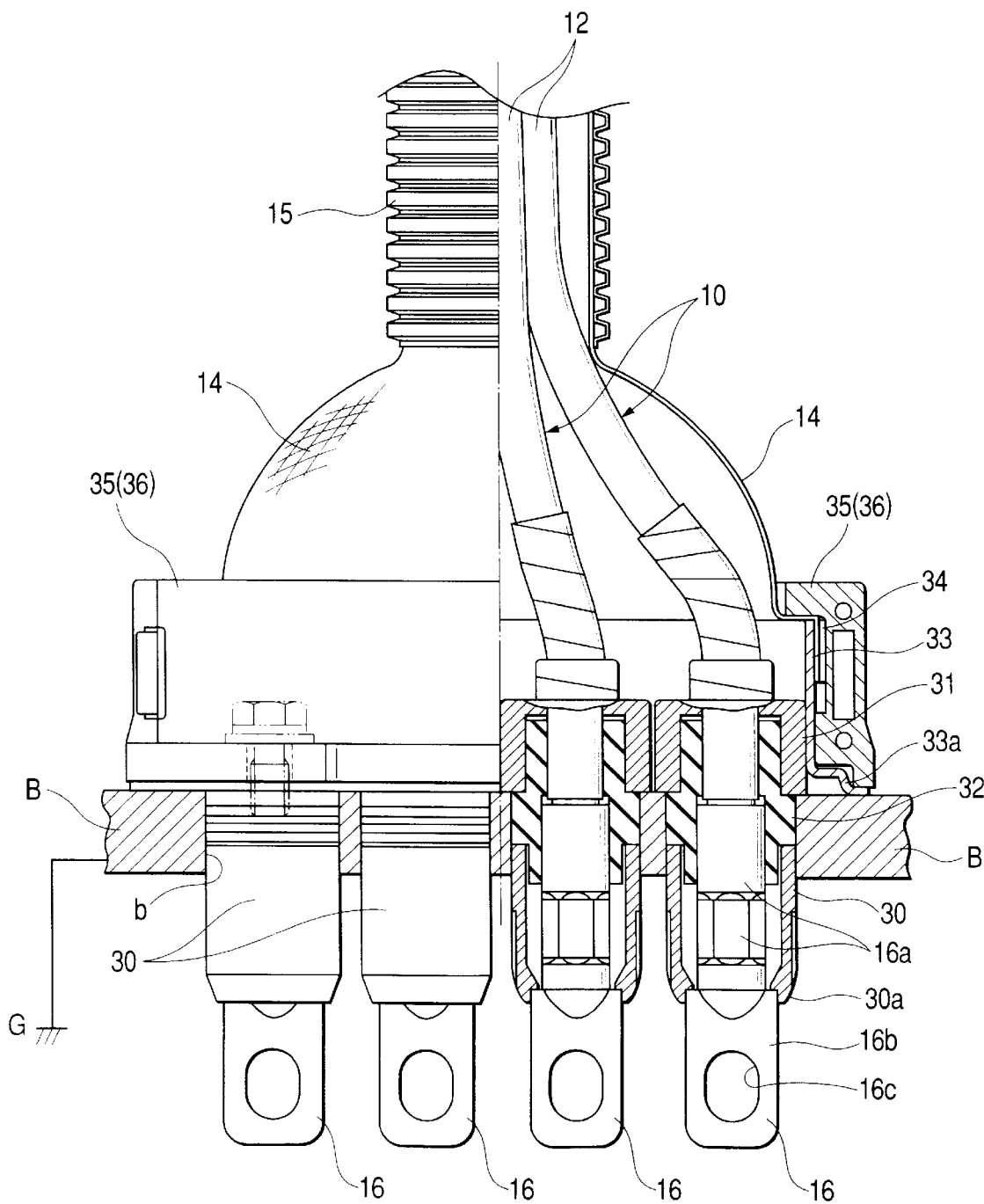
FIG. 5 is a front sectional view illustrating the second embodiment.

Next, FIGS. 4 and 5 are a side sectional view and a half-cutaway front sectional view each illustrating an electromagnetic shielding structure, which is a second embodiment of the invention. Incidentally, in these figures, constituent elements of this embodiment, which are similar to or the same as the constituent elements described in the description of the first embodiment shown in FIGS. 1 to 3, are designated by reference characters that are similar to or the same as those denote the latter constituent elements of the first embodiment.

In this case, the structure using a bundle of four electric wires 10 is illustrated in these figures. Four attaching holes b, the number of which corresponds to the number of the wires 10, are provided in the structure-attached body B. The wires 10 are held through a housing, which is fitted into the holes b by being in intimate contact therewith, and an elastic sealing member 32. Metal terminal fittings 16 are caulked and press-attached to conductors (not shown) exposed by performing a peeling operation at the terminals portions of the wires 10. Input/output terminals A of a motor or electric equipment are connected to bolt holes 16c provided at the end portions of the metal terminal fitting 16 by bolts 17 by being joined thereto, and then electrically conducted thereto.

Incidentally, the housing for holding the wires 10 consists of a cylindrical front housing 30 to be fitted into the attaching hole b of the structure-attached body B, and a rear housing 31 shaped like a cap cylinder and seated on the top surface of the structure-attached body B. The terminal portions of each of the wires 10 are passed through both the housings 30 and 31. Further, a cylindrical rubber elastic sealing member 32 is inserted and held between the front housing 30 and the rear housing 31 so that the housings 30 and 31 and the sealing member 23 are coaxially arranged. The terminal portion of each of the wires 10 is passed through the elastic sealing member 32 in such a way as to be in intimate contact therewith. A part of the circumferential surface of the elastic sealing member 32 is exposed from the gap between the front housing 30 and the rear housing 31 and brought into intimate contact with the attaching hole b. Thus, the watertight sealing between the sealing member 32 and the front housing 30 in the attaching hole b is ensured. Corrugates and notches are formed in the through hole 32a, through which the wires 10 are passed in such a way as to be in intimate contact therewith, of the elastic sealing member 32 so as to enhance the biteability and sealability thereof.

The entirety of the remaining part of the elastic sealing member 32 other than parts thereof, which are fitted into the structure-attached body B in such a way as to be watertightly in intimate contact with the structure-attached body B, can be held and protected in the front housing 30 and the rear housing 31, because the housing is established as a combination of two divided portions, that is, the front housing 30 and the rear housing 31. This is effective in preventing an occurrence of misalignment of the axis of the elastic sealing member 32.

Especially, regarding the front housing 30, as is apparent from FIG. 5, an end portion 30a thereof formed as a locking claw edge engages with a flat connecting portion 16b of the metal terminal fitting 16 from rear. Thus, the wires 10 are prevented from upwardly coming off, as viewed in this figure, that is, backwardly coming off. Moreover, the metal terminal fitting 16 is prevented from shaking.

The rear housing 31 is formed like a cap cylinder provided with step-like portions of different diameters as illustrated in this figure. The flange portion 31a provided like a guard at the leading edge of the cap trunk portion thereof is stably seated on the top surface of the structure-attached body B. The elastic sealing member 32 is fitted into the trunk portion and accommodated therein. A boss portion 31b having a step-like part formed by reducing the diameter of the cap rear-edge part thereof is held by being fitted onto the outer periphery of the wire 10. Thus, the rear housing 31 cooperates with the elastic sealing member 32 thereby to prevent each of the wires 10 from frontwardly slipping off.

On the other hand, an electrically conductive cylindrical shielding terminal 33 is disposed in such a way as to be fitted onto the outer periphery of the trunk portion of such a rear housing 31. The outer periphery of the trunk portion of the body of this shielding terminal 33 is covered with and brought into contact with the end part of the skirt portion of the braid 14. To prevent the end part of the skirt portion of the braid 14, which is connected to the trunk portion of the terminal, from slipping off therefrom, further, an electrically conductive ring-like clamp 34 is press-attached onto the braid 14 from the outside of the trunk portion of the terminal 33 by inserting the braid 14 into between the terminal 33 and the clamp 34. Thus, the end part of the skirt portion of the braid 14 is connected to the outer periphery of the trunk portion of the shielding terminal 33. However, further enhancement of the connection therebetween is ensured by performing spot-welding at places designated by reference character "w" with suitable pitches from the outer periphery of the clamp 34, as illustrated in FIG. 3 illustrating the first embodiment.

Furthermore, the shielding structure of this embodiment has a pair of protectors 35 and 36 of a casing serving as an outermost member in such a way as to accommodate the entire electromagnetic shielding structure portion composed of the aforementioned members therein. The clamp 34 is held by being press-attached to the inner surfaces of these protectors 35 and 36. Further, the flange portion 33a formed like a circular guard in the skirt bottom part of the shielding terminal 33 is sandwiched between the top surface of the structure-attached body B and each of flange portions 35a and 36a formed like guards on the skirt bottom parts of the protector trunk portions. The shielding terminal 33 is connected to the structure-attached body B by fastening together shielding terminal 33 and such flange portions by the bolts 28.

With the aforementioned configuration, the electromagnetic shielding structure, which is the second embodiment of the invention, can obtain electromagnetic shielding effects and the following actions, which are similar to those described in the foregoing description of the first embodiment.

That is, the housing consists of two divided portions, that is, the front housing 30 and the rear housing 31. Therefore, the second embodiment effectively prevents an occurrence of misalignment of the axis of the elastic shielding member 32. Further, the locking claw edge of the end portion 30a of the front housing 30 engages with the connecting portion 16b of the metal terminal fitting 16 from rear. Thus, the wires 10 are prevented from backwardly moving and coming off. Moreover, the metal terminal fitting 16 is prevented from shaking. Furthermore, the rear housing 31 cooperates with the elastic sealing member 32 thereby to prevent each of the wires 10 from frontwardly moving and slipping off, as viewed in these figures.

Additionally, even in this embodiment, the shielding terminal 33 fixedly attached to the end part of the skirt portion of the braid 14 is covered and protected by the protectors 35 and 36 from the outside. The flange portion 33a provided in the skirt portion of the shielding terminal 33 and the protectors 35 and 36 are connected to the structure-attached body B by being fastened together by the bolts 28. Thus, the electromagnetic shielding and the electrically conducting of the portion for connecting the wires to the input and output terminals are achieved.

Figure 6:
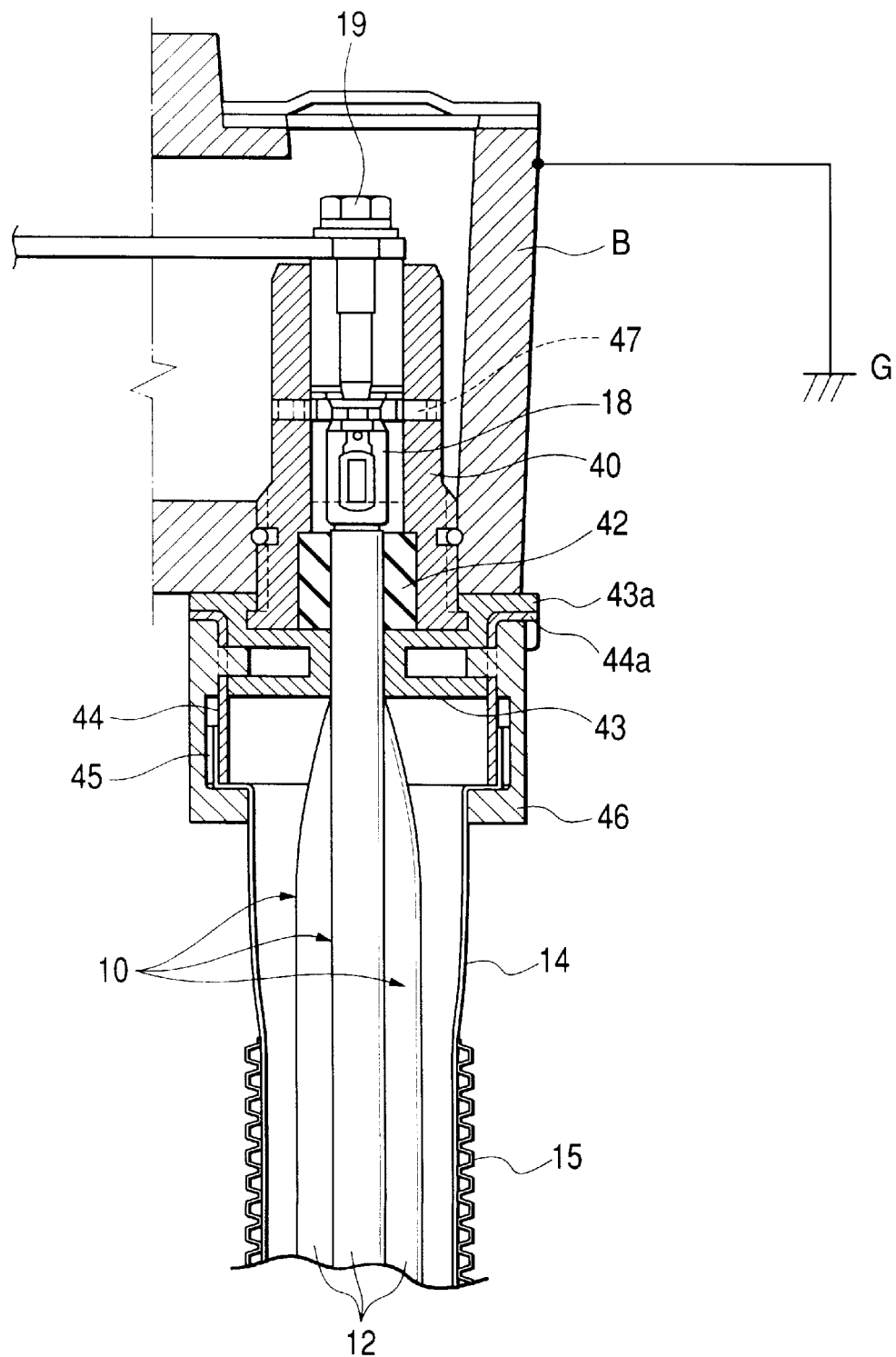
FIG. 6 is a side sectional view illustrating a third embodiment of an electromagnetic shielding structure of the invention.
Figure 7:
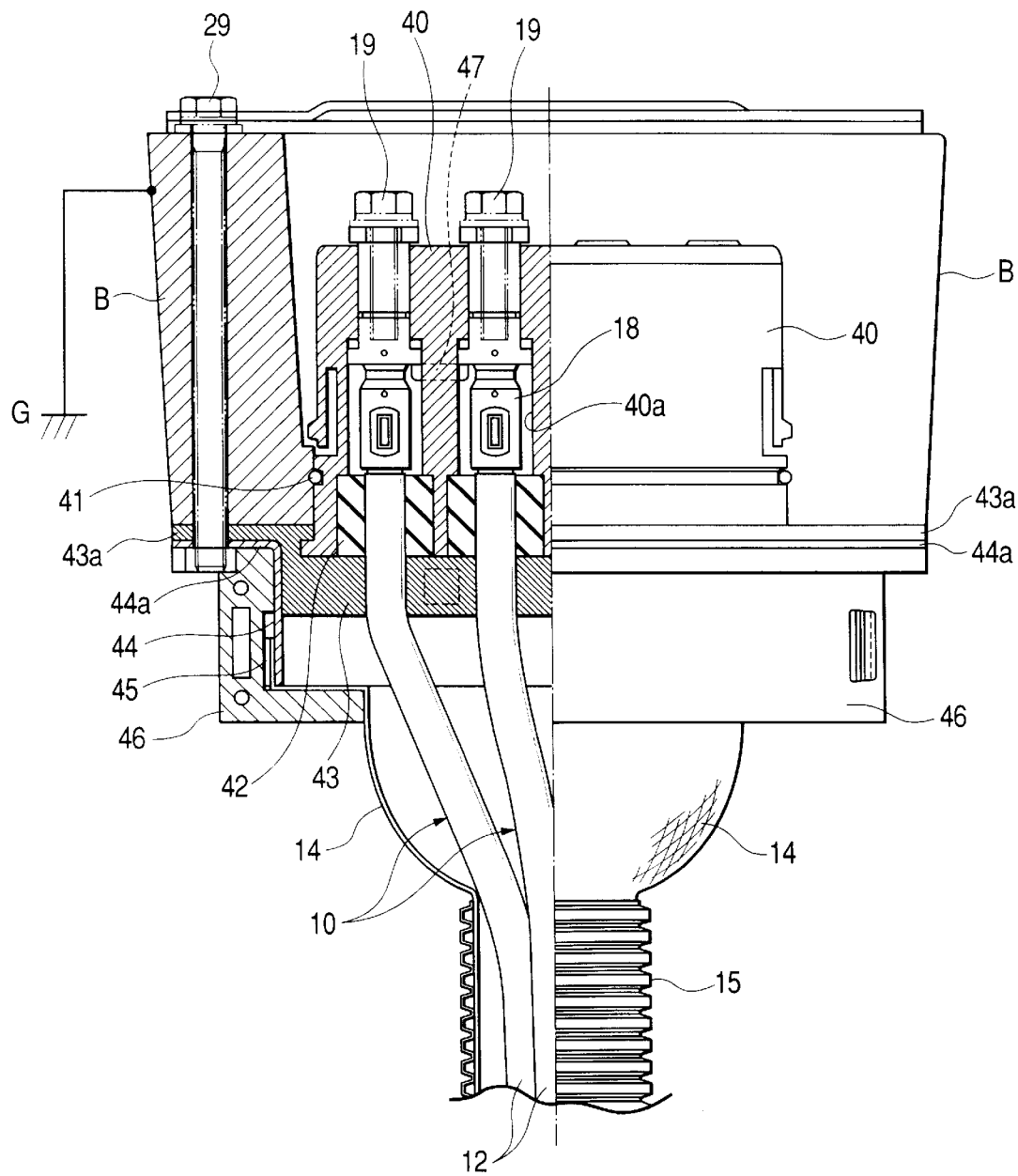
FIG. 7 is a front sectional view illustrating the third embodiment.
Figure 8:
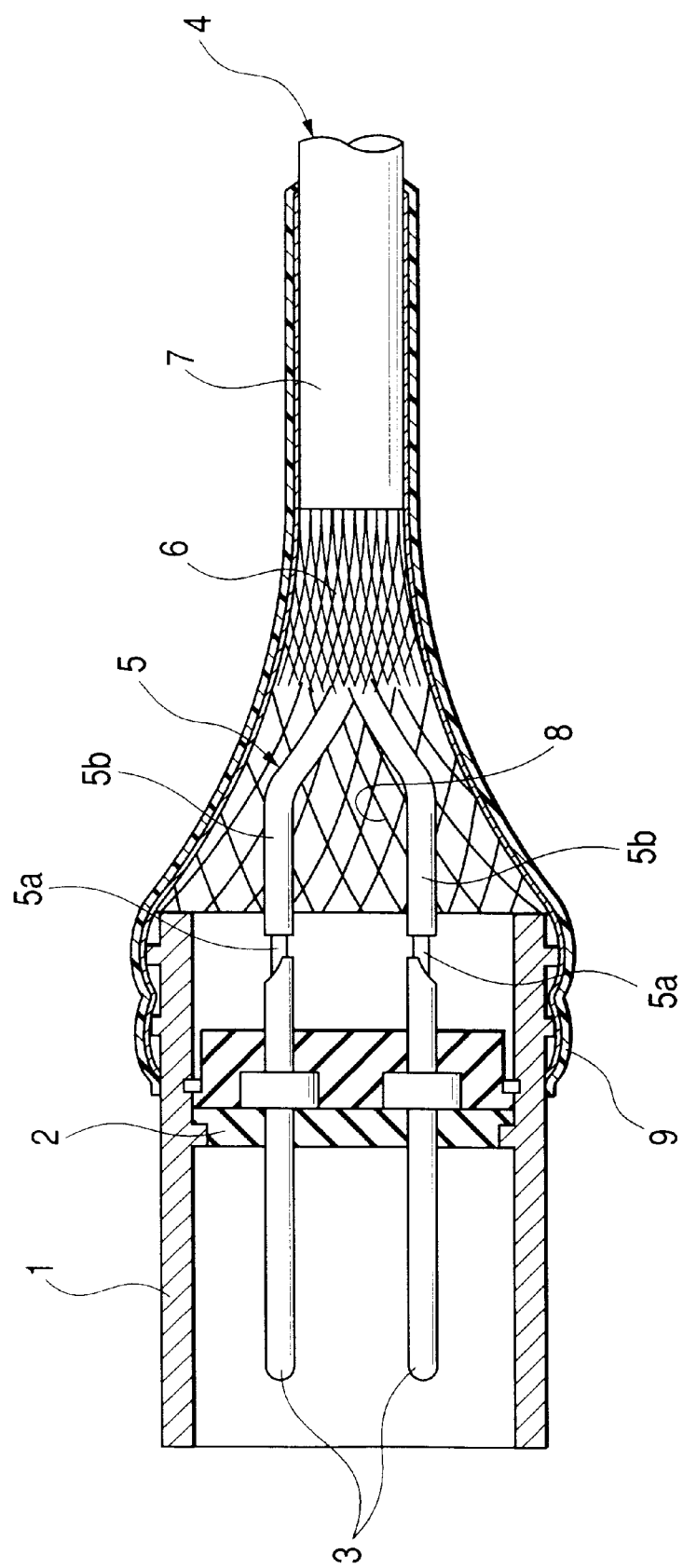
FIG. 8 is a sectional view illustrating a related structure.

Next, FIGS. 6 and 7 are a side sectional view and a half-cutaway front sectional view each illustrating an electromagnetic shielding structure, which is a third embodiment of the invention. Incidentally, in these figures, constituent elements of this embodiment, which are similar to or the same as the constituent elements described in the descriptions of the first embodiment shown in FIGS. 1 to 3 and the second embodiment shown in FIGS. 4 and 5, are designated by reference characters that are similar to or the same as those denote the latter constituent elements of the first and second embodiments.

Similarly, the structure using a bundle of four electric wires 10 is illustrated in these figures. The structure-attached body B is formed like a cylinder. A cover member 43 made by machining an electrically conductive metal in such a way as to be shaped like a disc and as to close an opening portion provided in the bottom portion of the structure-attached body B is connected to the structure-attached body B at the circumferential flange portions 43a by bolts 29. A housing 40 is fixed on the hop surface of such a cover member 43. An O-ring 41 is attached to a butting portions of the housing 40 and the structure-attached body B. Thus, the watertightness between the housing 40 and the structure-attached body B is ensured.

Holding holes, the number of which corresponds to the number of the wires 10, are provided in the housing 40 and the cover member 43 in such a way as to penetrate therethrough. Conductors (not shown) of the terminal portions of the wires 10 are exposed by performing a peeling operation thereon. Metal terminal fittings 18 are caulked and press-attached to the conductors. Moreover, the metal terminal fittings 18 are connected to the input and output terminals of a motor. The electrically conducting of the portion for connecting electric wires or cables to the input and output terminals is attained. Holding holes 40a, each of which has a size sufficient to the extent that such a metal terminal fitting can be held therein, are provided in the housing 40. Furthermore, a cylindrical rubber elastic shielding member 42 is held in an extension portion of each of the holding holes 40a in such a way as to be in intimate contact therewith. This elastic shielding member 42 is incorporated into the housing 42 in such away as to be in intimate contact therewith. Consequently, the metal terminal fittings 18 is prevented from downwardly and rearwardly slipping off, as viewed in these figures, that is, the wires 10 are prevented from downwardly and rearwardly slipping off.

Further, a cylindrical shielding terminal 44 made of an electrically conductive metal is provided therein in such a manner as to be press-contacted with the disk-like outer circumferential surface of the cover member 43 and as to cover this circumferential surface from the outside. A flange portion 44a projected like a guard is formed in the circumferential portion of this shielding terminal 44. This flange portion 44a and the flange portion 43a of the cover member 43 are superposed on each other and fastened together by the elongated bolts 29. Moreover, the terminal portion of the braid 14 is connected to the outer circumferential surface of the shielding terminal 44 by widening the skirt portion of the braid 14 and being brought into contact with the outer circumferential surface of the terminal 44. The connected end part of the skirt portion of the braid 14 is fixedly attached thereto by being fastened by a metallic clamp 45, which is shaped like an electrically conductive ring, from the outside. To make the contact and connection between the braid 14 and the shielding terminal 44, which are fastened by the clamp 45, more firm and reliable, spot-welding may be performed on the outer circumferential portion of the clamp 45 with suitable pitches from the outside. Further, the protector 46 is provided in such a way as to accommodate the clamp 45 by being fitted thereonto from the outside. The entire electromagnetic shielding structure portion consisting of the aforementioned members is accommodated in this protector 46.

Such a third embodiment can obtain effects and actions similar to those of the first and second embodiments.

That is, in this case, the housing 40 is carried on, especially, the electrically conductive cover member 43, and fixed thereto. The wires 10 are held in the housing 40 by being passed therethrough way of the elastic sealing member 42. Thus, the third embodiment is effective in preventing an occurrence of misalignment of the axis of the wire 10. Moreover, this embodiment is also effective in preventing the elastic sealing member 42 from slipping off. Furthermore, the stopper 47 provided in the housing 40 prevents the metal terminal fittings 18 from moving in the direction of the axis thereof and slipping off.

Further, similarly as the shielding terminals of the first and second embodiments, the shielding terminal 44, to which the end part of the skirt portion of the braid 14 is fixedly attached, is accommodated and protected in the protector 46. The shielding terminal 44 is fastened at the flange part 44a of the skirt portion thereof together with the protector 46 to the structure-attached body B. Thus, the electromagnetic shielding and the electrically connecting of the portion for connecting the wires to the input and output terminals are achieved.

Moreover, the end part of the skirt portion of the braid 14 sandwiched between the terminal 25 and the clamp 45, the shielding terminal 25 placed at the inner side, and the clamp 45 may be integrally welded to one another by spot-welding the band-like clamp 26. With such a fixed structure, the braid 14 is not caused by a tensile external force and a torsional force to come off from the shielding terminal 44. After the wires 10 are connected to the input and output terminals, the influence of electromagnetic waves can be eliminated owing to excellent electrical conductivity and shielding effects. Consequently, stable electric characteristics can be maintained. Further, the reliability due to the wiring of the wires 10 can be enhanced.

As described above, according to the electromagnetic shielding structure of the invention, in the case that the electrically conductive shielding sheet that covers the full length of the electric wire, when an electromagnetic shield is electrically conducted by connecting an end part of a skirt portion of this braid to the structure-attached body B, the end part of the skirt portion of this braid is inserted into between the shielding terminal and the clamp and fixed to therebetween. Thus, the end part of the skirt portion of the braid can be reliably and firmly connected to the structure-attached body B. The clamp is shaped like a band. Thus, the end part of the skirt portion of the braid is tightly fastened, so that sufficient contact is obtained over the entire circumference thereof. Moreover, this structure can completely eliminate the fear that the braid may be tore. Consequently, it can be expected that effective electromagnetic shielding effects are obtained. Further, stable electric characteristics are obtained, so that the reliability of the connection therebetween can be enhanced.

Further, in this case, the entire electromagnetic shielding structure portion is accommodated in the protector. Thus, the first magnetic shielding structure is effective in protecting the electrically shielding sheet, such as the braid, without exposing the shielding sheet to the outside.

Moreover, according to the electromagnetic shielding structure of the invention, the housing is divided into the front portion and the rear portion. Thus, the entire elastic sealing member other than the parts, which are fitted into the wire-mounted body B in such a manner as to be watertightly in intimate contact therewith, can be held and protected in the front housing and the rear housing. Moreover, this electromagnetic shielding structure is effective in preventing an occurrence of misalignment of the axis of the elastic shielding member.

Furthermore, according to the electromagnetic shielding structure of the invention, when the housing is closed by the electrically conductive cover member, this electromagnetic shielding structure is effective in preventing an occurrence of misalignment of the axis of the wire passed through and held in the housing by way of the elastic sealing member. This electromagnetic shielding structure is also effective in preventing the elastic shielding member from slipping off. Furthermore, the movement in the direction of the axis and the slip-off of the metal terminal fitting is regulated and prevented by the stopper 47 provided in the housing.

Further, according to the electromagnetic shielding structure of the invention, the electrically conductive band-like clamp is spot-welded. Thus, the entire circumference of the end part of the skirt portion of the braid serving as the electrically conductive shielding sheet is brought into rigid contact with the shield terminal. Thus, there are no fears that the contact force may be insufficient that the braid may be tore. Reliable shielding and conducting between the structure-attached body B and the shielding terminal are achieved. Consequently, stable electromagnetic-shielding effects can be obtained.

Additionally, the electromagnetic shielding structure of the invention can provide more stable and reliable shielding and conducting of the portion for connecting electric wires or cables to the input and output terminals by bolting the shielding terminal and the protector to the structure-attached body.

What is claimed is:

1. An electromagnetic shielding structure comprising:

an electrically conductive grounded and structure-attached body;

an insulating housing, through which an electric wire is passed, watertightly fitted into and held by the structure-attached body;

an elastic sealing member fitted into and held by the housing and being in watertight contact with an outer periphery of the wire;

a flexible and electrically conductive shielding sheet for covering the wire;

a shielding terminal electrically conducted with the structure-attached body in a state in which an outer surface thereof is covered by and contacted with an end part of a skirt portion of the shielding sheet;

a band-like clamp tightly fasten the end part of the skirt portion of the shielding sheet from the outside thereof and to cause the end part of the skirt portion to be in intimate contact with the outer surface of the shielding terminal; and a protector for covering the clamp from the outside thereof and for accommodating and protecting the structure-attached body, the housing, the elastic sealing member, the shielding sheet, the shielding terminal, and the clamp.

2. The electromagnetic shielding structure according to claim 1, wherein the housing includes front and rear housing portions holding the elastic sealing member from front and rear sides thereof, respectively, to bring a part of an outer circumferential surface of the elastic sealing member into intimate contact with the structure-attached body, and the front housing is engaged with a metal terminal attached to an end portion of the wire.

3. The electromagnetic shielding structure according to claim 1, wherein the elastic sealing member is closed by an electrically conductive cover from one side thereof, and a stopper is provided to the housing to prevent a metal terminal attached to the wire from moving.

4. The electromagnetic shielding structure according to claim 1, wherein an inner portion of the shield sheet is welded to the shielding terminal by performing spot-welding on the clamp.

5. The electromagnetic shielding structure according to claim 1, wherein end parts of skirt portions of the shielding terminal and the protector are together connected to the structure-attached body by bolt.

* * * * *